Feb. 14, 1928.
P. DI PIETRO ET AL
1,658,975
VEHICLE SIGNAL
Filed July 6, 1926
2 Sheets-Sheet 1
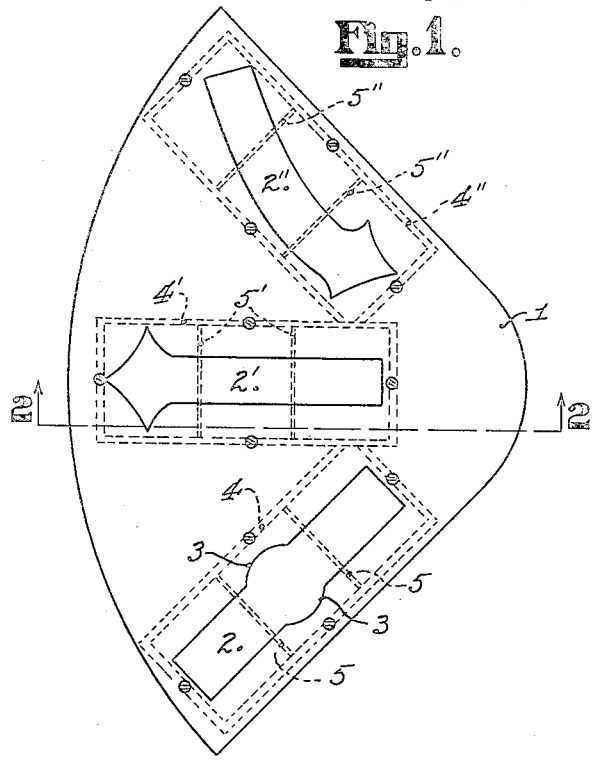
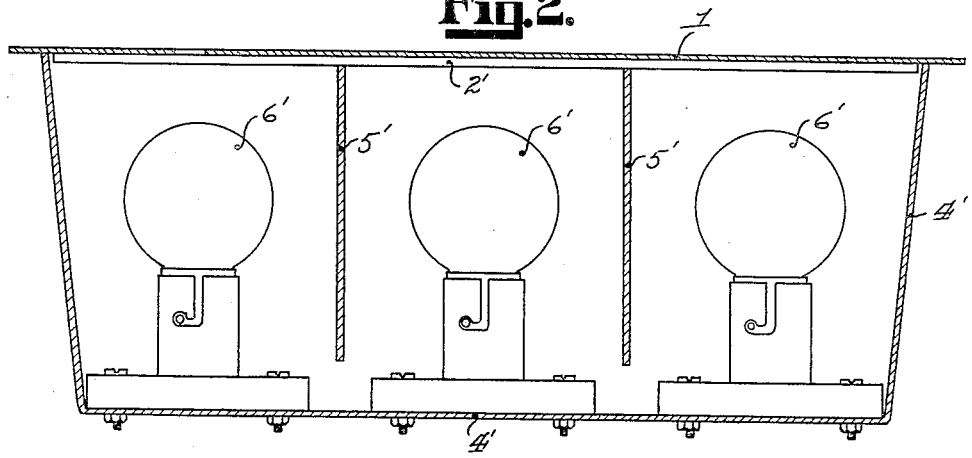
INVENTORS
Paul Di Pietro,
Harry M. Edwards
BY Booth & Booth
ATTORNEYS Feb. 14, 1928.

P. DI PIETRO ET AL 1,658,975

VEHICLE SIGNAL

Filed July 6, 1926

INVENTORS
Paul Di Pietro
Harry M. Edwards

BY Booth & Booth
ATTORNEYS.

Patented Feb. 14, 1928.

1,658,975

UNITED STATES PATENT OFFICE.

PAUL DI PIETRO AND HARRY M. EDWARDS, OF SAN FRANCISCO, CALIFORNIA.

VEHICLE SIGNAL.

Application filed July 6, 1926. Serial No. 120,656.

Our invention relates to the class of electrically illuminated signal devices used upon vehicles to indicate the intention of the driver to turn, slow down, or stop.

One of the objects of our invention is to provide such a signal in which the visibility of the illuminated indicating members is enhanced by a system of consecutively flashing lights, giving the illusory appearance of motion. A second object is to provide illuminated signal members whose positions correspond to the arm-signals required by law or custom in various States and localities, and to provide means for illuminating such signal members in such a manner as to give an illusory appearance of motion roughly corresponding to the motion of the arm in making such arm-signals.

These and other objects and advantages of our invention will be apparent from the following specification, which should be read with the understanding that the form, construction, and arrangement of the several parts of the device may be varied, within the limits of the claims hereto appended, without departing from the spirit of the invention as set forth therein.

With this in view, a preferred embodiment of our invention will now be fully described with reference to the accompanying drawings, wherein:

Fig. 1 is a front elevation of the exposed portion of our signal device, having the illuminated signal members therein.

Fig. 2 is a section taken in the direction of the arrows on the line 2—2 of Fig. 1.

Figure 3:
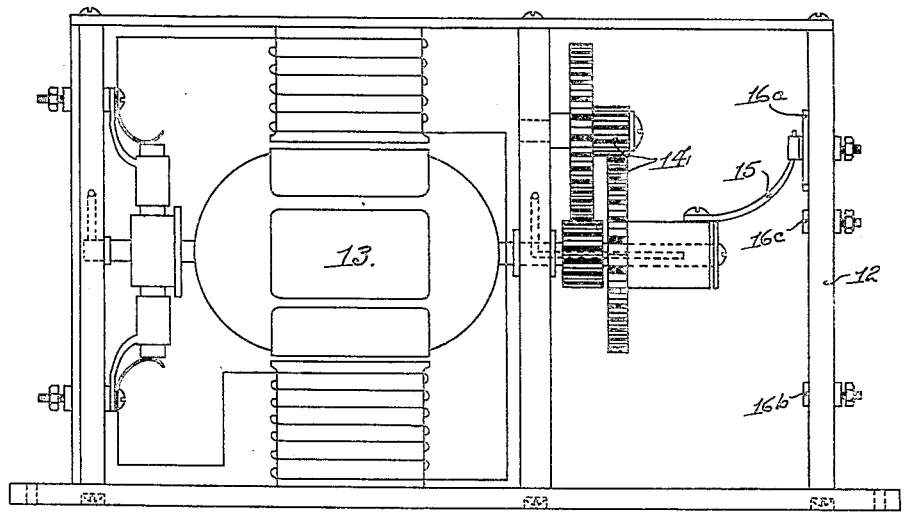
Fig. 3 is a partly diagrammatic elevation of the flasher switch and driving motor therefor.

In the drawings, the reference numeral 1, Figs. 1 and 2, designates a face plate which carries the visible indicating members 2, 2', and 2". The plate 1 is intended to be attached, by any convenient means, not shown, to a suitable portion of a vehicle, either at the rear, or front, or both. The indicating members 2, 2', and 2" are preferably glass plates mounted behind suitably formed and positioned apertures in said plate 1. They may be colored as desired, and are preferably translucent.

In the form of device shown in Fig. 1, which is particularly adapted for use in the State of California and in other States having similar laws or customs relating to arm-signals, the indicating member 2, which, when illuminated by means to be described later, indicates "slow" or "stop", is in the form of a straight bar having a lateral enlargement 3 at its center and inclined downwardly toward the left, as shown. The signal member 2', indicating "left turn" is in the form of a horizontal arrow pointing toward the left; and the signal member 2", indicating "right turn", is in the form of an arrow, preferably curved as shown, pointing and inclined downwardly toward the right.

These positions of the indicating members correspond to the arm-signals required by law or custom in certain States, for example California, where, in making such arm-signals, the left arm is extended downwardly to indicate "slow" or "stop", horizontally to indicate "left turn", and upwardly to indicate "right turn".

The signal members 2, 2', and 2" are illuminated by electric lights mounted in the rear of the plate 1. For this purpose elongated boxes 4, 4', and 4" are secured to the rear face of said plate behind the signal members 2, 2', and 2" respectively. Each box is divided by the respective partitions 5, 5', and 5", into a plurality of chambers, and in each such chamber there is mounted an electric lamp, the lamps of the respective boxes being designated 6, 6', and 6". The number of chambers and lamps in each box is immaterial, three being shown in the drawings, (Figs. 2 and 4).

Figure 4:
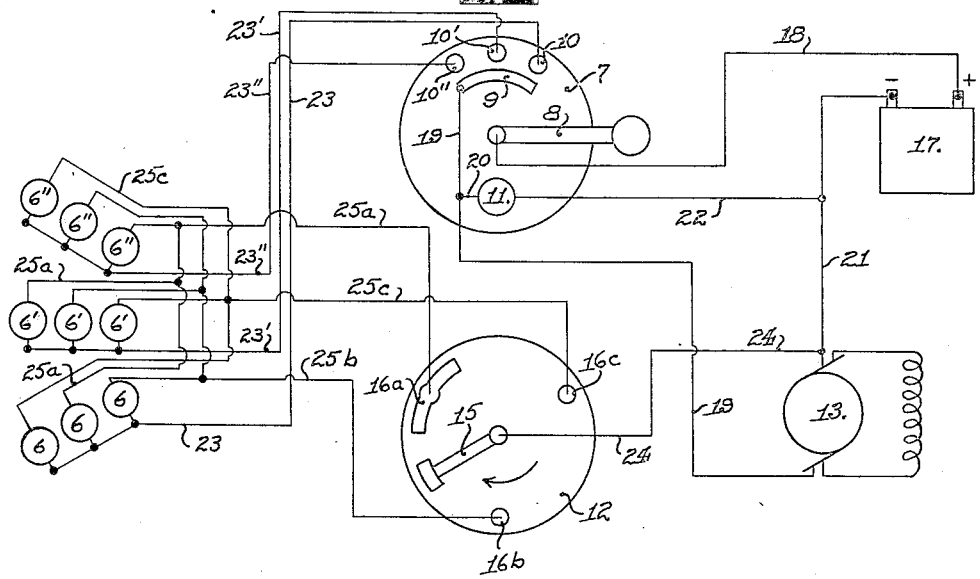
Fig. 4 is a diagram of the electrical connections of the entire signal device.

The groups of lamps 6, 6', and 6" of the respective signal members are controlled selectively by a suitable manually operated switch 7, Fig. 4, which has a movable contact 8, an arcuate stationary contact 9, and three stationary contact points 10, 10', and 10" corresponding to the three groups of lamps 6, 6', and 6". The switch also has a tell-tale lamp indicated at 11, which lights when any of the groups of signal lamps are lit. The circuits will be described in detail hereinafter.

The groups of signal lamps are further controlled by an automatic flasher switch in such a manner that when any one group is illuminated by the manual switch 7, the several lamps of that group are flashed on and off consecutively, to give an appearance of movement to the illuminated signal member. This flasher switch is indicated at 12 in Fig. 4, and is operated by an electric motor indicated at 13.

The construction of a preferred form of flasher is shown in Fig. 3. The motor 13 is provided with suitable speed-reducing gearing 14. Upon the hub of the last or slow speed gear is secured a spring contact arm 15, whose end describes a circular path over the spaced stationary contacts 16ª, 16ᵇ, and 16ᶜ, of the switch 12. The switch 12 is mounted upon the frame of the motor 13, as shown. Each stationary contact 16 is connected with one lamp of each group.

Turning now to the diagram shown in Fig. 4, the source of current is indicated as a battery 17, which may be the usual storage battery or other source of current for the operation of the vehicle engine. A wire 18 leads from one terminal (shown merely for example as the positive terminal) of the battery to the movable contact 8 of the manual selector switch 7. The arcuate stationary contact 9 of said switch is connected by a wire 19 with the flasher motor 13, and by a wire 20 with the tell-tale lamp 11. Wires 21 and 22 lead from said motor and said tell-tale lamp to the other terminal of the battery.

The stationary contacts 10, 10', and 10" of the selector switch are respectively connected by wires 23, 23', and 23" with the three groups of signal lamps 6, 6', and 6". Each of said wires is connected with all the lamps in its group, as shown. The movable contact 15 of the automatic flasher switch 12 is connected by a wire 24 and the wire 21 with the negative terminal of the battery, and the stationary contacts 16ª, 16ᵇ, and 16ᶜ of said switch are respectively connected by wires 25ª, 25ᵇ, and 25ᶜ, with one lamp in each signal group, so that no matter which group is lit by the selector switch, the several lamps of that group will be flashed successively by the action of the automatic flasher switch.

It should be noted that one contact, 16ª, of the flasher switch, is longer than the others, and that this contact is connected, by the wire 25ª, with the lamp in each group which lies back of the head of the arrow in the groups 6' and 6" or the central enlargement 3 in the case of the group 6; i. e. the center lamp of the lower or "stop" group 6, the left hand lamp of the "left turn" group 6', and the right hand lamp of the "right turn" group 6", are all connected by the wire 25ª with the elongated flasher contact 16ª. This provides a slightly longer period of illumination for these lamps than for the others, with the result that the heads of the arrows, and the center enlargement 3 of the "stop" signal, are visually emphasized.

It will be seen that the effect of the automatic flashing of the signal lamps is to give an illusory appearance of movement to the signal member illuminated thereby. Thus in the case of the "left turn" signal, for example, the effect is that of an illuminated arrow pointing and moving toward the left, this effect being produced by the successive flashing of the lamps 6' beginning at the right hand end and running up to the left hand end, with a slightly longer flash at the left. The opposite effect is, of course, produced by the "right turn" signal.

A second illusory effect may be produced by the manipulation of the selector switch. Thus if said switch be moved slowly across the contacts 10 and 10' to the contact 10", the three signal members are successively flashed, ending with the "right turn" signal. This produces an effect corresponding to that of an out-stretched arm which is first extended from the side of the vehicle and then raised to its final position pointing upward. And by moving the switch contact 8 back and forth across all three contacts 10, 10', and 10", ending at 10, the effect is that of an extended arm being waved up and down, and finally brought to rest pointing downwardly, to indicate "slow" or "stop". By this means our signal may be made much more effective, especially to those accustomed to a definite series of arm signals than would be the case by a simple illumination of the signal members.

We claim:—

1. A vehicle signal device comprising a plurality of signal members, each formed as a bar with a lateral enlargement at one portion of its length, said enlargements being at different relative positions in the respective bars; a group of lamps adapted to illuminate each signal member throughout its length, one lamp of each group being positioned in close relation to the enlargement; means for selectively controlling said groups of lamps; and means for flashing the individual lamps of each group in a predetermined sequence adapted to emphasize the illumination of the lateral enlargement.

2. A vehicle signal device comprising a signal member in the form of a bar with a lateral enlargement at one portion of its length; a row of lamps for illuminating said signal member throughout its length, one of said lamps being positioned in close relation to said lateral enlargement; and means for flashing said lamps in a predetermined sequence adapted to emphasize the illumination of said lateral enlargement.

In testimony whereof we have signed our names to this specification.

PAUL DI PIETRO.
HARRY M. EDWARDS.